US008078038B2

(12) United States Patent
Masuda et al.

(10) Patent No.: US 8,078,038 B2
(45) Date of Patent: Dec. 13, 2011

(54) CONTENT RECEPTION/RECORDING DEVICE, METHOD, PROGRAM, AND RECORDING MEDIUM

(75) Inventors: Rikiya Masuda, Osaka (JP); Hideaki Nakaoka, Osaka (JP)

(73) Assignee: Panasonic Corporation, Osaka (JP)

( * ) Notice: Subject to any disclaimer, the term of this patent is extended or adjusted under 35 U.S.C. 154(b) by 744 days.

(21) Appl. No.: 11/574,215

(22) PCT Filed: Oct. 11, 2005

(86) PCT No.: PCT/JP2005/081701
§ 371 (c)(1),
(2), (4) Date: Sep. 29, 2008

(87) PCT Pub. No.: WO2006/041060
PCT Pub. Date: Apr. 20, 2006

(65) Prior Publication Data
US 2009/0016695 A1    Jan. 15, 2009

(30) Foreign Application Priority Data
Oct. 13, 2004    (JP) .................................. 2004-298974

(51) Int. Cl.
*H04N 7/26*    (2006.01)
(52) U.S. Cl. ......... 386/297; 386/264; 386/294; 386/248
(58) Field of Classification Search .................. 386/124, 386/297
See application file for complete search history.

(56) References Cited

U.S. PATENT DOCUMENTS

| | | | |
|---|---|---|---|
| 6,185,360 B1 | 2/2001 | Inoue et al. | |
| 6,539,429 B2 * | 3/2003 | Rakavy et al. | 709/224 |
| 6,798,972 B1 * | 9/2004 | Ito et al. | 386/344 |
| 7,136,578 B2 * | 11/2006 | Ito et al. | 386/264 |
| 7,337,456 B1 * | 2/2008 | Nihei | 725/35 |
| 7,773,859 B1 * | 8/2010 | Potrebic et al. | 386/291 |
| 2002/0010775 A1 * | 1/2002 | Rakavy et al. | 709/224 |
| 2003/0133384 A1 * | 7/2003 | Yada et al. | 369/53.45 |
| 2003/0149985 A1 | 8/2003 | Ohno et al. | |
| 2003/0208771 A1 * | 11/2003 | Hensgen et al. | 725/100 |
| 2004/0126100 A1 * | 7/2004 | Ito et al. | 386/124 |
| 2004/0226038 A1 * | 11/2004 | Choi | 725/32 |
| 2005/0114214 A1 * | 5/2005 | Itoh | 705/14 |
| 2005/0129010 A1 * | 6/2005 | Maeda et al. | 370/389 |
| 2005/0213931 A1 * | 9/2005 | Kudara | 386/46 |

FOREIGN PATENT DOCUMENTS

| | | |
|---|---|---|
| JP | 10-174037 | 6/1998 |
| JP | 11-032310 | 2/1999 |
| JP | 11-355703 | 12/1999 |
| JP | 2001-028725 | 1/2001 |
| JP | 2002-123446 | 4/2002 |
| JP | 2002-269899 | 9/2002 |

(Continued)

*Primary Examiner* — Kambiz Zand
*Assistant Examiner* — Yonas Bayou

(57) ABSTRACT

A content reception/recording device for selectively receiving and accumulating transmitted contents. The content reception/recording device comprises: a receiving unit; an accumulation medium; a storage unit storing therein free time slot information that indicates a free time slot in which a predetermined operation specified by a user is not performed; an obtaining unit operable to obtain transmission timing information that indicates timings at which contents are transmitted respectively; a determining unit operable to, when a plurality of accumulation target contents are transmitted in the free time slot, determine priorities of the contents for being accumulated in the free time slot, in accordance with the transmission timing information obtained by the obtaining unit; and a control unit operable to control the receiving unit to receive the accumulation target contents in accordance with the determined priorities and to accumulate the received contents in the accumulation medium.

18 Claims, 7 Drawing Sheets

FOREIGN PATENT DOCUMENTS

| | | |
|---|---|---|
| JP | 2003-198971 | 7/2003 |
| JP | 2003-230059 | 8/2003 |
| JP | 2005-157509 | 6/2005 |
| WO | 03/055205 | 7/2003 |

* cited by examiner

FIG.6

| | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|---|
| VIEWING RECORD | 0107 | - | - | - | - | - | - | - | - | - | - | W | W | W | - | - | - | - | - | W | W | W | W | W | W |
| | 0108 | W | - | - | - | - | - | - | - | - | - | - | - | W | W | - | - | - | - | - | - | - | W | W | W |
| | 0109 | W | - | - | - | - | - | - | - | - | - | - | W | W | W | - | - | - | - | W | - | W | W | W | W |
| VIEWING TENDENCY | | 2 | 0 | 0 | 0 | 0 | 0 | 0 | 0 | 0 | 0 | 1 | 2 | 3 | 2 | 0 | 0 | 0 | 0 | 1 | 1 | 2 | 3 | 3 | 3 |

600

61 — VIEWING RECORD
62 — VIEWING TENDENCY

CONTENT RECEPTION/RECORDING DEVICE, METHOD, PROGRAM, AND RECORDING MEDIUM

TECHNICAL FIELD

The present invention relates to a content reception/recording device for receiving a digital broadcast, and especially relates to a technology for receiving and accumulating contents transmitted by a data broadcast service.

BACKGROUND ART

In the digital broadcasting, a data broadcast is provided, as well as the television broadcast that has been provided in the conventional analog broadcasting. Users of the data broadcast service can obtain information relating to the programs provided in the television broadcast, or can use services such as the online shopping.

In the data broadcasts, providing various services in addition to the currently provided services are studied. One of such services is a content accumulation service in which a video content or the like having a large capacity is transmitted by the data broadcast, and the transmitted content is accumulated in a recording medium of a reception device so that the user can view the content in a desired time.

In one embodiment of the content accumulation service, accumulation target contents are determined using, for example, preference information that indicates the program viewing tendency of the user, and contents are automatically accumulated in accordance with the determined accumulation target contents.

Such automatic accumulation services provide high usability to the users since they enable the contents to be accumulated automatically, eliminating the need to perform operations to accumulate each content.

Meanwhile, the number of contents that can be received in the same time slot in a content accumulation service is restricted based on the hardware resource of the reception device. For example, when contents are transmitted simultaneously in two different transport streams (TSs), a reception device having only one tuner can receive the content in one of the TSs at a time while it cannot receive the content in the other TS.

Since there is the above-described restriction, when a plurality of different accumulation target contents are transmitted in a same time slot, a conventional automatic accumulation service determines priorities of the accumulation target contents for being accumulated, in accordance with a certain standard such as the above-mentioned preference information of the user.

With this method, however, while contents are automatically received and accumulated, if the user changes the channel or the like and the reception device comes to receive a different TS, the automatic reception and accumulation of a content, which has been performed until the change, is stopped.

In general, a content is composed of a plurality of modules such as those of video data and audio data, and when the data has been accumulated only in part, the viewing may not be possible. For this reason, stopping the accumulation of the content is not preferable for the user.

Document 1 identified below discloses a technology which, to prevent the accumulation of the content from being stopped, controls the channel change of the user based on the content transmission end time (see Document 1).

Further, Document 2 identified below discloses a technology which, when the accumulation of the content is stopped due to the channel change by the user, the part of the content having been accumulated before the channel change is stored, and then, when the user selects the former channel, it accumulates the remaining part of the content (see Document 2).

Document 1: Japanese Patent Application Publication No. 2003-230059
Document 2: Japanese Patent Application Publication No. 2003-198971

DISCLOSURE OF THE INVENTION

The Problems the Invention Is Going to Solve

Each of the technologies disclosed in the above-introduced documents, however, has a problem. That is to say, in the case of the technology of Document 1, as the channel change is restricted, the user operation is hindered. Also, in the case of the technology of Document 2, the remaining part of the content is not accumulated if the user does not select the former channel again.

It is therefore an object of the present invention to provide a content reception/recording device that makes less number of contents not-viewable even if accumulations of contents are stopped halfway, without adversely affecting the operability of the user.

Means to Solve the Problems

The above-described object of the present invention is fulfilled by a content reception/recording device for selectively receiving and accumulating transmitted contents, comprising: a receiving unit; an accumulation medium; a storage unit storing therein free time slot information that indicates a free time slot in which a predetermined operation specified by a user is not performed; an obtaining unit operable to obtain transmission timing information that indicates timings at which contents are transmitted respectively; a determining unit operable to, when a plurality of accumulation target contents are transmitted in the free time slot, determine priorities of the contents for being accumulated in the free time slot, in accordance with the transmission timing information obtained by the obtaining unit; and a control unit operable to control the receiving unit to receive the accumulation target contents in accordance with the determined priorities and to accumulate the received contents in the accumulation medium.

Effects of the Invention

The free timeslot indicted by the free time slot information stored in the content reception/recording device having the above-stated structure is a time slot during which there is a low probability that the accumulation of the content is stopped by an operation instruction entered by the user.

In a conventional technology in which priorities of the contents for being accumulated are determined using the preference information or the like, there is a fear that the accumulation of the content is stopped by an operation instruction entered by the user. In contrast, the content reception/recording device having the above-stated structure accumulates the content in a time slot during which there is a low probability that the accumulation of the content is stopped by an operation instruction entered by the user. Accordingly, the structure of the present invention can reduce the ratio of contents that are incompletely accumulated, compared with the conventional technology.

Meanwhile, to reduce the ratio of contents that are incompletely accumulated as much as possible, it is preferable that the accumulation of a content that is difficult to accumulate is performed first.

One specific example of such a content that is difficult to accumulate is a content that is transmitted less frequently than the other contents. This is because it has less chance to be accumulated than the other contents.

For the above-stated reasons, the determining unit may detect a number of remaining transmissions of each of the plurality of accumulation target contents by referring to the transmission timing information, and determines the priorities such that a content having a less number of remaining transmissions is assigned with a higher priority for the accumulation.

With the above-stated structure, it is possible to accumulate, by priority, a content that has less chance to be accumulated, among a plurality of accumulation target contents that are transmitted in the time slot.

A content that has more amount of not-accumulated data than the other accumulation target contents requires a longer time to be completely accumulated, and has more fear that the accumulation thereof is stopped. It is accordingly preferable that such a content that has more amount of not-accumulated data is accumulated by priority so that the accumulation thereof is not stopped.

On the other hand, a content that has less amount of not-accumulated data than the other accumulation target contents requires a shorter time to be completely accumulated. It is preferable for users who desire to have increased number of viewable contents that such a content that has less amount of not-accumulated data is accumulated by priority.

For the above-stated reasons, the determining unit may detect an amount of not-accumulated data of each of the plurality of accumulation target contents from (i) accumulation states of the accumulation target contents in the accumulation medium and (ii) the transmission timings of the accumulation target contents indicated by the transmission timing information, and determines the priorities such that a content having a larger or smaller amount of not-accumulated data is assigned with a higher priority for the accumulation.

With the above-stated structure, it is possible to accumulate contents efficiently depending on whether the amount of not-accumulated data is small or large.

A content that requires a longer time to be completely accumulated than the other accumulation target contents is a content that is difficult to be completely accumulated, as is the case with a content that has more amount of not-accumulated data than the other accumulation target contents.

For the above-stated reasons, the determining unit may determine the priorities of the contents for being accumulated in the free time slot such that a content whose not-accumulated data requires a longer time to accumulate is assigned with a higher priority for the accumulation.

With the above-stated structure, it is possible to efficiently accumulate contents that require a longer time to accumulate.

Also, the determining unit may detect an accumulation completion time for each of the plurality of accumulation target contents, in accordance with (i) accumulation states of the accumulation target contents in the accumulation medium and (ii) transmission timings of the accumulation target contents indicated by the transmission timing information, and determines the priorities such that a content having an earlier accumulation completion time is assigned with a higher priority for the accumulation.

The above-mentioned time slot is a time slot in which the user has not entered an operation instruction. However, the user may enter an operation instruction into the content reception/recording device at any point in time in the time slot, for any reason.

The content reception/recording device with the above-stated structure accumulates, by priority, a content that is completed to be accumulated earlier even if there is a possibility that the user enters an operation instruction in the time slot. This increases the success ratio in completing the accumulation of the content.

Also, the determining unit may select an accumulation target content whose accumulation is completed within the time slot, out of the plurality of accumulation target contents, in accordance with (i) accumulation states of the accumulation target contents in the accumulation medium and (ii) transmission timings of the accumulation target contents indicated by the transmission timing information, and determines the priorities such that the selected content is assigned with a higher priority for the accumulation.

With the above-stated structure, it is possible to accumulate, by priority, a content whose accumulation is completed within the time slot when the content whose accumulation is completed within the time slot and a content whose accumulation is not completed within the time slot are transmitted in a same time slot.

In a time slot when the user enters an operation instruction, the operation instruction by the user is executed by priority, and the accumulation of an accumulation target content may not be performed. However, with the above-stated structure in which a content whose accumulation is completed within the time slot is accumulated by priority, it is possible to efficiently accumulate the accumulation target content.

Meanwhile, time slots in which the user enters operation instructions into the content reception/recording device are not necessarily fixed. For example, the time slots in which the user is active may vary as the living conditions of the user change.

For this reason, the content reception/recording device may further comprise: an operation time slot recording unit operable to record, as an operation time slot, a time slot in which the predetermined operation instructed by the user is performed; and a free time slot detecting unit operable to detect a free time slot in which the predetermined operation instructed by the user is performed at a predetermined frequency or lower, wherein the free time slot information stored in the storage unit indicates the detected free time slot.

With the above-stated structure, it is possible to perform the process of receiving and accumulating contents based on the record of the time slots in which the user actually entered operation instructions into the content reception/recording device.

Furthermore, if the time slots in which the user enters operation instructions change, the content reception/recording device can store therein, in response to the change, the time slots in which the user does not enter operation instructions.

Also, the operation time slot recorded by the operation time slot recording unit may be a time slot in which a hardware resource for receiving or accumulating the transmitted content operates according to an instruction by the user.

The content reception/recording device having the above-stated structure records therein the time slots in which hardware resources for receiving or accumulating contents operate, as the time slots in which the user enters operation instructions.

That is to say, the content reception/recording device does not record therein the time slots in which hardware resources not related to receiving or accumulating contents operate, as the time slots in which the user enters operation instructions.

Accordingly, compared with the case where the time slots in which the user enters operation instructions in general are recorded, it is possible to accurately detect the time slots which have low possibility that the accumulation of a content is stopped by an operation instruction entered by the user.

Also, the transmission timing information may further include type information that indicates types of transmitted contents, the content reception/recording device further comprises a viewing tendency recording unit recording therein a viewing tendency of the user for each of the types of transmitted contents indicated by the type information, and the determining unit determines the priorities in accordance with the type information and transmission timings of the transmitted contents indicated by the transmission timing information, such that a content having a higher viewing tendency of the user is assigned with a higher priority for the accumulation.

It should be noted here that a type of a content is, for example, a genre of a content.

The content reception/recording device having the above-stated structure can reflect the user's viewing tendency concerning the content type, in the accumulation of contents.

Also, the receiving unit may receive contents that are transmitted by a digital broadcasting, the transmission timing information further includes channel information that indicates channels over which the contents are transmitted, the content reception/recording device further comprises a channel viewing tendency recording unit recording therein a channel viewing tendency of the user, and the determining unit determines the priorities in accordance with the channel information and the transmission timing of each accumulation target content indicated by the transmission timing information, such that a content having a higher channel viewing tendency of the user is assigned with a higher priority for the accumulation.

The content reception/recording device having the above-stated structure can reflect the user's viewing tendency concerning the channel, in the accumulation of contents.

Also, the transmission timing information may further include importance level parameters that indicate importance levels of the transmitted contents, and the determining unit determines the priorities in accordance with the importance level parameters and the transmission timing of each accumulation target content indicated by the transmission timing information, such that a content having a predetermined importance level parameter is assigned with a higher priority for the accumulation.

Here, the importance level parameters include parameters that indicate the first broadcast and the last broadcast of a content, such as a drama series, that is transmitted in a plurality of divided broadcasts.

The content reception/recording device having the above-stated structure can determine a content to accumulate among a plurality of accumulation target contents, by taking a predetermined importance level parameter into consideration.

Also, the determining unit may further include a reception subunit operable to receive, from the user, priorities of the plurality of accumulation target contents for the accumulation, and if the reception subunit has received the priorities from the user, the control unit controls the receiving unit in accordance with the priorities received by the reception subunit.

With the above-stated structure, it is possible to accumulate contents in accordance with the priorities desired by the user. For example, if there is a content that is especially desired by the user to be accumulated, it is possible to accumulate the content by priority while the user is not conscious of the accumulation.

Also, the content reception/recording device may preliminarily store therein priorities of the plurality of accumulation target contents for being received, and the control unit controls the receiving unit in accordance with the preliminarily stored priorities.

With the above-stated structure, it is possible to accumulate contents without referring to the transmission timings of the accumulation target contents. This structure is useful when, for example, the transmission timings of contents to be transmitted are fixed and the priorities for the accumulation are determined preliminarily.

The above-described object of the present invention is also fulfilled by a content reception/recording method for use in a content reception/recording device which is provided with an accumulation medium and selectively receives and accumulates transmitted contents in the accumulation medium, the content reception/recording method comprising the steps of: receiving; storing free time slot information that indicates a free time slot in which a predetermined operation specified by a user is not performed by the content reception/recording device; obtaining transmission timing information that indicates timings at which contents are transmitted respectively; determining, when a plurality of accumulation target contents are transmitted in the free time slot, priorities of the contents for being accumulated in the free time slot, in accordance with the transmission timing information obtained in the obtaining step; and controlling to receive the accumulation target contents in accordance with the determined priorities and to accumulate the received contents in the accumulation medium.

With the above-stated structure, it is possible to efficiently accumulate contents that are difficult to accumulate completely.

The above-described object of the present invention is also fulfilled by a control program for causing a content reception/recording device, which is provided with an accumulation medium, to perform a process of selectively receiving and accumulating transmitted contents in the accumulation medium, the control program comprising the steps of: receiving; storing free time slot information that indicates a free time slot in which a predetermined operation specified by a user is not performed by the content reception/recording device; obtaining transmission timing information that indicates timings at which contents are transmitted respectively; determining, when a plurality of accumulation target contents are transmitted in the free time slot, priorities of the contents for being accumulated in the free time slot, in accordance with the transmission timing information obtained in the obtaining step; and controlling to receive the accumulation target contents in accordance with the determined priorities and to accumulate the received contents in the accumulation medium.

Use of the program having the above-stated structure enables the contents to be accumulated efficiently.

The above-described object of the present invention is also fulfilled by a computer-readable recording medium recording therein a control program for causing a content reception/recording device, which is provided with an accumulation medium, to perform a process of selectively receiving and accumulating transmitted contents in the accumulation medium, the control program recorded in the recording medium comprising the steps of: receiving; storing free time slot information that indicates a free time slot in which a predetermined operation specified by a user is not performed by the content reception/recording device; obtaining transmission timing information that indicates timings at which contents are transmitted respectively; determining, when a plurality of accumulation target contents are transmitted in the free time slot, priorities of the contents for being accumulated in the free time slot, in accordance with the transmission timing information obtained in the obtaining step; and controlling to receive the accumulation target contents in accordance with the determined priorities and to accumulate the received contents in the accumulation medium.

With this, it is possible to circulate the recording medium that records therein the program, by distributing it, for example.

The above-described object of the present invention is also fulfilled by an information processing device comprising: a storage unit storing therein free time slot information that indicates a free time slot in which a predetermined operation specified by a user is not performed; an obtaining unit operable to obtain transmission timing information that indicates timings at which contents are transmitted respectively; a determining unit operable to, when a plurality of accumulation target contents are transmitted in the free time slot, determine priorities of the contents for being accumulated in the free time slot, in accordance with the transmission timing information obtained by the obtaining unit; and a control unit operable to control reception of the accumulation target contents in accordance with the determined priorities and to accumulate the received contents.

The above-stated structure realizes an information processing device that can accumulate contents efficiently, compared with conventional ones.

In the above-described content reception/recording device, when a plurality of complementation target contents, which require complementation, are transmitted in the free time slot, the determining unit may determine priorities of the complementation target contents for being complemented with respect to accumulation in the free time slot, in accordance with the transmission timing information obtained by the obtaining unit; and the control unit controls the receiving unit to receive the complementation target contents in accordance with the determined priorities for complementation and to accumulate the received complementation target contents in the accumulation medium.

The above-stated structure realizes a content reception/recording device that can efficiently accumulate contents that require complementation because the accumulation thereof has been stopped.

BRIEF DESCRIPTION OF THE DRAWING

FIG. 6 shows a viewing time management table 600 managed by the viewing time managing unit 113.

BEST MODE FOR CARRYING OUT THE INVENTION

Embodiment

Figure 1:
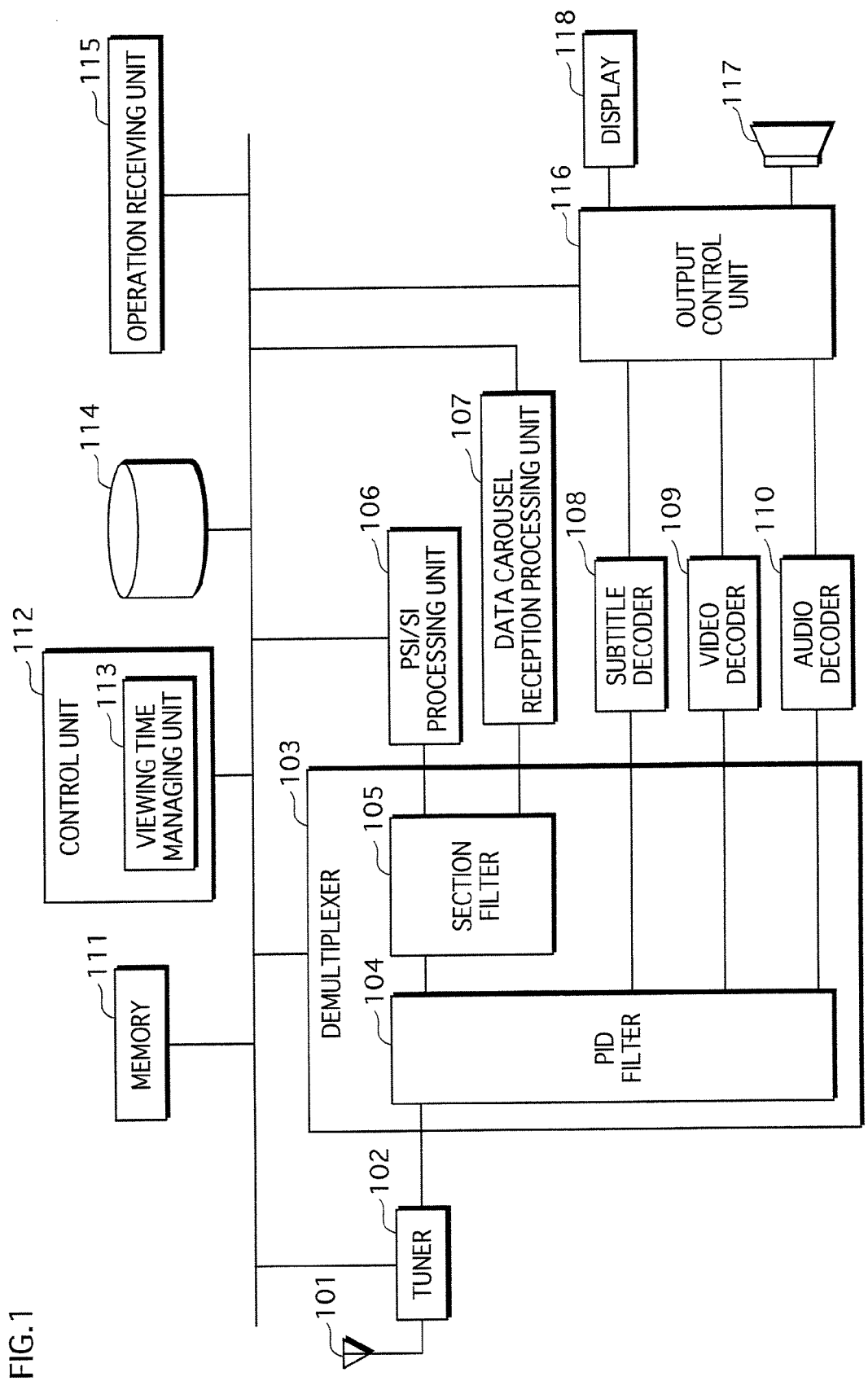
FIG. 1 is a functional block diagram of the content reception/recording device in an embodiment of the present invention.

The following will describe a content reception/recording device 1000 in an embodiment of the present invention, with reference to the attached drawings.

<Outline>

In the present embodiment, description will be provided centering on the content reception/recording device 1000 that receives and accumulates contents transmitted by a digital broadcasting. Before a detailed description of the content reception/recording device 1000, an outline of the data transmission method used in the digital broadcasting will be described first, and then an outline of the reception process in the content reception/recording device 1000 will be described.

Video data, audio data and the like are encoded before they are broadcast in the digital broadcasting. The encoded video data, encoded audio data and the like are referred to as elementary streams (ES). An ES having been packetized in predetermined units is referred to as a packetized elementary stream (PES). For example, the video data is packetized in units of frames, and the audio data is packetized in units of blocks.

In the digital broadcasting, the PES, which may contain various types of data such as video and audio, is divided into transport stream packets (TSP), and the TSPs are multiplexed into a transport stream (TS), which is transmitted in the broadcasting.

The TS is composed of a plurality of TSPs. A TSP is a fixed-length packet of 188 bytes, and includes a 4-byte packet header. The packet header of the TSP includes 13-bit information called packet ID (PID). One PES packet is divided into a plurality of TSPs which each have a same PID, when the PES packet is transmitted. The type of each TSP contained in the TS can be identified by the PID and program specification information (PSI).

Upon receiving a TS, the content reception/recording device 1000 refers to the PID in each TSP contained in the received TS to identify the type of each TSP, and performs a filtering. The filtering is performed to convert each type of data into a PES format. The converted PES-format data is processed by corresponding decoders. This enables video, audio and the like to be displayed or the like in the digital broadcasting.

Meanwhile, in the digital broadcasting, one TS may contain contents of a plurality of channels. In this case, the content reception/recording device 1000 refers to the PID of each TSP contained in the TS so as to select and receive a content of a channel that is desired by the user. Also, with respect to the data broadcast service, which is one of the features of the digital broadcasting, it is possible to identify, by referring to the PID, whether or not the received TS was transmitted for the data broadcasting service.

Up to now, an outline of the data transmission method used in the digital broadcasting has been described. From now on, an outline of the reception process in the content reception/recording device 1000 will be described.

The content reception/recording device 1000 in the present embodiment receives and accumulates data broadcast contents that are transmitted as the data broadcast service. There are various forms of contents accumulation services in the digital broadcasting. For example, in an automatic accumulation service in which the content reception/recording device 1000 starts to accumulate a content by referring to the electronic program guide (EPG) without causing the user to notice, the control information in the data transmitted in the data broadcast service may contain a signal that indicates that the transmitted data includes a content that automatically starts to be accumulated. With this structure, the content reception/recording device 1000 can start accumulating a content while the user is not conscious of the operation of the accumulation.

Meanwhile, in general, the digital broadcasting provides a larger number of receivable channels and programs than the analog broadcasting. For this reason, when there are a plurality of contents that are the targets of accumulation for the content reception/recording device 1000, the plurality of contents may be transmitted in the same time slot. The data accumulation capacity of the content reception/recording device 1000 is restricted based on the hardware resource. Accordingly, the content reception/recording device 1000 may not receive all of the plurality of contents transmitted in the same time slot.

For example, when the content reception/recording device 1000 has only one tuner, only one TS can be received simultaneously in a time slot. In this case, when two accumulation target contents are transmitted in different TSs in the same time slot, the accumulation target content in one TS can be received, but the accumulation target content in the other TS cannot be received.

In such a case where accumulation target contents having a more amount of data than the data accumulation capacity of the device itself are transmitted in the same time slot, the content reception/recording device 1000 of the present embodiment enables the data broadcast content to be accumulated more efficiently than the conventional technologies, based on the timing when each accumulation target content is transmitted, and the information which indicates time slots in which the user does not perform an operation.

It should be noted here that the accumulation target contents include (a) contents that the content reception/recording device 1000 stopped accumulating, and (b) contents that the content reception/recording device 1000 has not yet started accumulating.

Also, the content reception/recording device 1000 of the present embodiment determines a content to be newly accumulated, based on the preferences of the user or the like, and automatically accumulates the determined content.

<Function>

FIG. 1 is a functional block diagram of the content reception/recording device in an embodiment of the present invention.

As shown in FIG. 1, the content reception/recording device 1000 includes an antenna 101, a tuner 102, a demultiplexer 103, a PSI/SI processing unit 106, a data carousel reception processing unit 107, a subtitle decoder 108, an video decoder 109, an audio decoder 110, a memory 111, a control unit 112, an accumulation medium 114, an operation receiving unit 115, an output control unit 116, a speaker 117, and a display 118. The demultiplexer 103 includes a PID filter 104 and a section filter 105. The control unit 112 includes a viewing time managing unit 113.

The antenna 101 receives a signal broadcast in the digital broadcasting, and transfers the received signal to the tuner 102.

The tuner 102 performs processes such as the demodulation and error correction onto the input signal, and generates a TS. The tuner 102 sends the generated TS to the demultiplexer 103.

The demultiplexer 103, which includes the PID filter 104 and the section filter 105, uses the PID filter 104 and the section filter 105 to sort out the components multiplexed in the TS, based on the PIDs. Here, the components indicate elements constituting a program, such as video, audio, and data. The demultiplexer 103 sends the sorted out components to the decoders and the like that correspond thereto.

The PID filter 104 filters each TSP, which constitutes the TS, by referring to the PID contained in the packet header of the TSP. The PID filter 104 extracts stream-format data such as video, audio, and subtitle from the payload of the TSP, and outputs the extracted stream-format data to the video decoder 109, the audio decoder 110, and the subtitle decoder 108 that respectively correspond thereto. The PID filter 104 also sends the TSP, which is section format data such as program specification information/service information (PSI/SI) and a data broadcast content, to the section filter 105. The PSI/SI will be explained later in the <PSI/SI>section.

The section filter 105, upon receiving the TSP being the section format data from the PID filter 104, filters the TSP. The section filter 105 extracts, from the payload of the TSP, (a) the data constituting the PSI/SI and (b) the data constituting the data broadcast content that is transmitted by the data carousel transmission method, and sends the PSI/SI to the PSI/SI processing unit 106. The section filter 105 also sends the data broadcast content to the data carousel reception processing unit 107. It is presumed here that the data broadcast content being the target of accumulation in the content reception/recording device 1000 of the present embodiment is transmitted by the DSM-CC (Digital Storage Media Command and Control) data carousel method (ISO/IEC 13818-6) The data carousel transmission method will be explained later in the <Data Carousel>section.

The PSI/SI processing unit 106, upon receiving the data constituting the PSI/SI from the section filter 105, performs a process of generating the PSI/SI, and sends the generated PSI/SI to the memory 111.

The data carousel reception processing unit 107, extracts DII (Download Info Indication) and DDB (Download Data Block), which are data constituting the data broadcast content, from the section filter 105, and performs a process of generating the data broadcast content.

The subtitle decoder 108, upon receiving the character stream data of the subtitle and the like from the demultiplexer 103, performs the decoding.

The video decoder 109, upon receiving the video stream data from the demultiplexer 103, performs the decoding.

The audio decoder 110, upon receiving the audio stream data from the demultiplexer 103, performs the decoding.

The memory 111 stores therein data that is necessary for displaying a content, such as the PSI/SI, the electronic program guide (EPG) contained in the PSI/SI, and the data broadcast content.

The control unit 112, which includes a CPU (Central Processing Unit), a ROM (Read Only Memory), a RAM (Random Access Memory) and the like, performs a process of receiving and displaying a program that is broadcast in the digital broadcasting, and a process concerning the accumulation of data broadcast contents, in accordance with a program stored in a memory such as the ROM.

The viewing time managing unit 113 manages the time period during which the user instructed, via the operation receiving unit 115, the content reception/recording device 1000 to operate, and stores the time period in a viewing time management table.

The accumulation medium 114 is a high-capacity recording medium such as a HDD (Hard Disk Drive) or an optical disc, accumulates the data broadcast contents received by the content reception/recording device 1000.

The operation receiving unit 115 receives user operations such as a power ON/OFF and a switch between viewing channels.

The output control unit 116 receives the data from the subtitle decoder 108, the video decoder 109, and the audio decoder 110, performs the synchronization process, the multiplexing process and the like, outputs a video signal to the display 118, and outputs an audio signal to the speaker 117.

The speaker 117 receives the audio signal, and outputs audio.

The display 118 receives the video signal, and displays video.

<Data>

From now on, the data used by the content reception/recording device 1000 of the present embodiment will be described.

Figure 2:
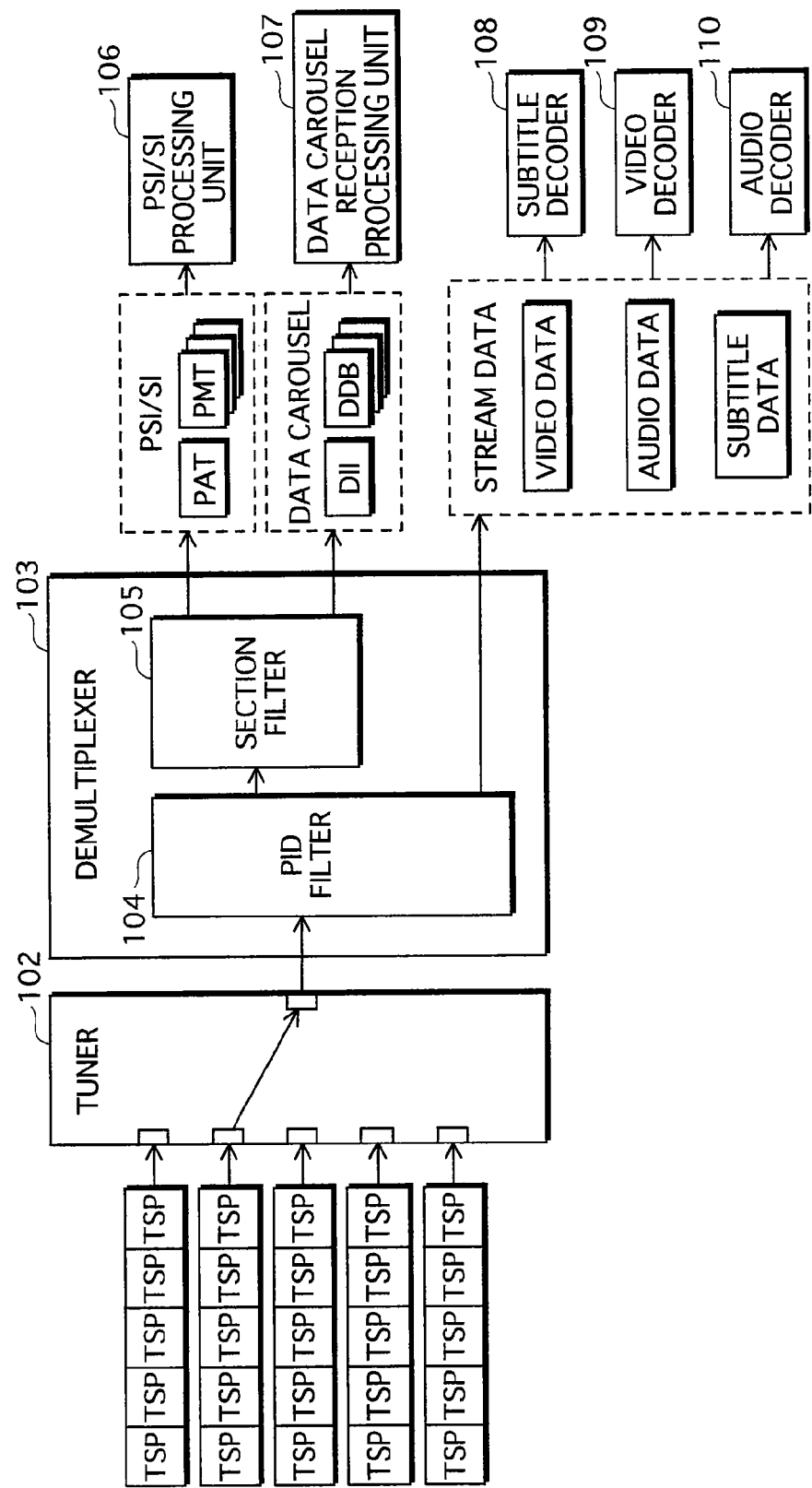
FIG. 2 shows an outline of the data received by the content reception/recording device 1000.

FIG. 2 shows an outline of the data received by the content reception/recording device 1000.

As shown in FIG. 2, in the content reception/recording device 1000, the tuner 102 selects a desired TS among a plurality of TSs, and receives the selected TS. It should be noted here that although only one TS can be received simultaneously in the present embodiment, the number of TSs that can be received simultaneously is not limited to one. For example, the device can a plurality of TSs simultaneously if it is provided with a plurality of tuners.

The received TS is input to the demultiplexer 103, and as described above, the components included in the TS are output to -the decoder and the data processing unit respectively corresponding thereto. Among the output components, the PSI/SI output to the PSI/SI processing unit includes PAT (Program Association Table), PMT (Program Map Table) and the like. Also, the data constituting the data carousel includes the DII and the DDB.

The following will describe the data constituting the data carousel.

<PSI/SI>

The PSI/SI defines what is contained in the whole TS, and includes information such as the structure of the content contained in the TS. More specifically, the PSI/SI includes the PAT, the PMT, the CAT (Conditional Access Table), the NIT (Network Information Table) and the like.

The PAT is a table in which the program that is broadcast in the digital broadcasting is stored in correspondence with the PID indicated by the PMT.

The PMT is a table in which stream data such as video and audio, which constitutes the program that is broadcast in the digital broadcasting, is stored in correspondence with the PID.

The CAT stores therein a list of PIDs of the packets in which individual information of the programs broadcast in the digital broadcasting is written.

The NIT is a table which stores therein information on the physical network parameters such as the channel number, the modulation method, and the guard interval.

The SI is information made by extending the PSI information to include the program information. The EPG data is transmitted by the SI in the digital broadcasting. The EPG data includes EIT (Event Information Table) and SDT (Service Description Table).

The EIT include information on the programs broadcast in the digital broadcasting. Examples of the information included in the EIT are the name, broadcast date/time, and profile of the programs.

The SDT include information on the channel name, the type of EIT transmitted in each channel, and the like.

The content reception/recording device 1000 obtains, by referring to the PSI/SI, programs transmitted in the digital broadcasting, information on the transmission timing of data broadcast contents, and the individual information of the data broadcast contents.

It should be noted here that the PSI/SI and the EPG data are defined in the standard "SERVICE INFORMATION FOR DIGITAL BROADCASTING SYSTEM" (ARIB STD-B10) provided by the ARIB (Association of Radio Industries and Business).

<Data Carousel>

Next, the data constituting the data carousel will be explained, as well as the data carousel transmission method.

In the data carousel transmission method, the same data is repeatedly transmitted during a predetermined period so that the content reception/recording device 1000 can obtain the necessary data at a given timing.

Figure 3:
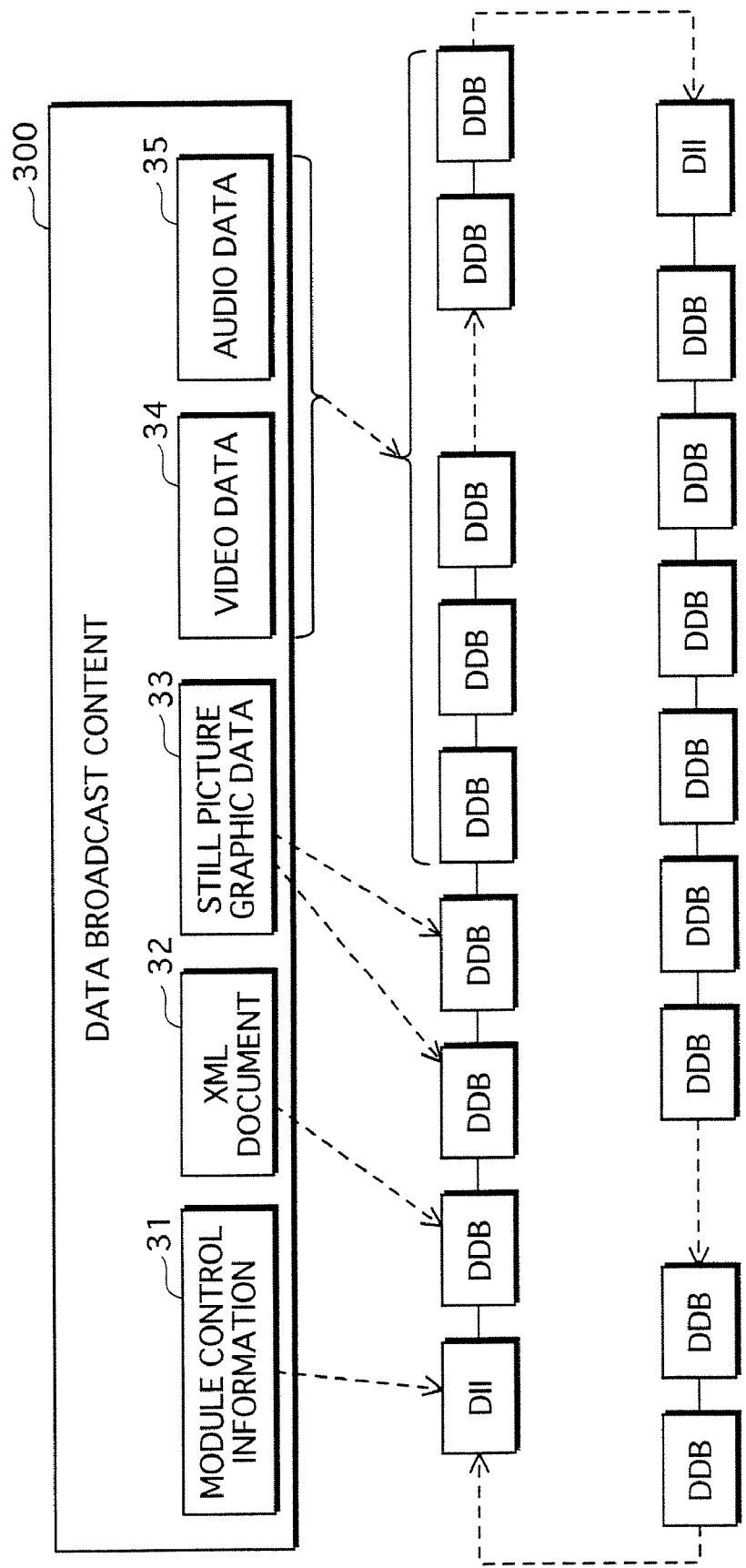
FIG. 3 is a conceptual illustration of the data transmitted by the data carousel transmission method.

FIG. 3 is a conceptual illustration of the data transmitted by the data carousel transmission method.

As shown in FIG. 3, a data broadcast content 300, which is a content transmitted in the data broadcast, includes module control information 31 and a plurality of modules. The modules constituting the data broadcast content 300 includes an XML document 32, still picture graphic data 33, video data 34, and audio data 35.

The module control information 31 is control information regarding the modules that constitute the carousel.

The XML document 32 includes description of a screen structure and a document when the data broadcast content 300 is displayed on the display 118. It should be noted here that although the XML document is written in XML, it may be written in a markup language other than XML, such as HTML and BML. Also, the XML document 32 may be a computer program written in Java or the like.

The still picture graphic data 33 includes still pictures and graphic data referred to by the XML document 32.

The video data 34 and the audio data 35 are data that constitutes an accumulation type content that is presumed to be viewed with accumulation thereof.

A plurality of pieces of data constituting the data broadcast content 300 are divided into the DII and a plurality of DDBs, and are repeatedly transmitted. For example, the module control information 31 is in the DII when it is transmitted. Also, the XML document 32, the still picture graphic data 33, the video data 34, and the audio data 35 are divided and contained in a plurality of DDBs when they are transmitted.

<DII>

Here, the DII will be described in detail.

Figure 4:
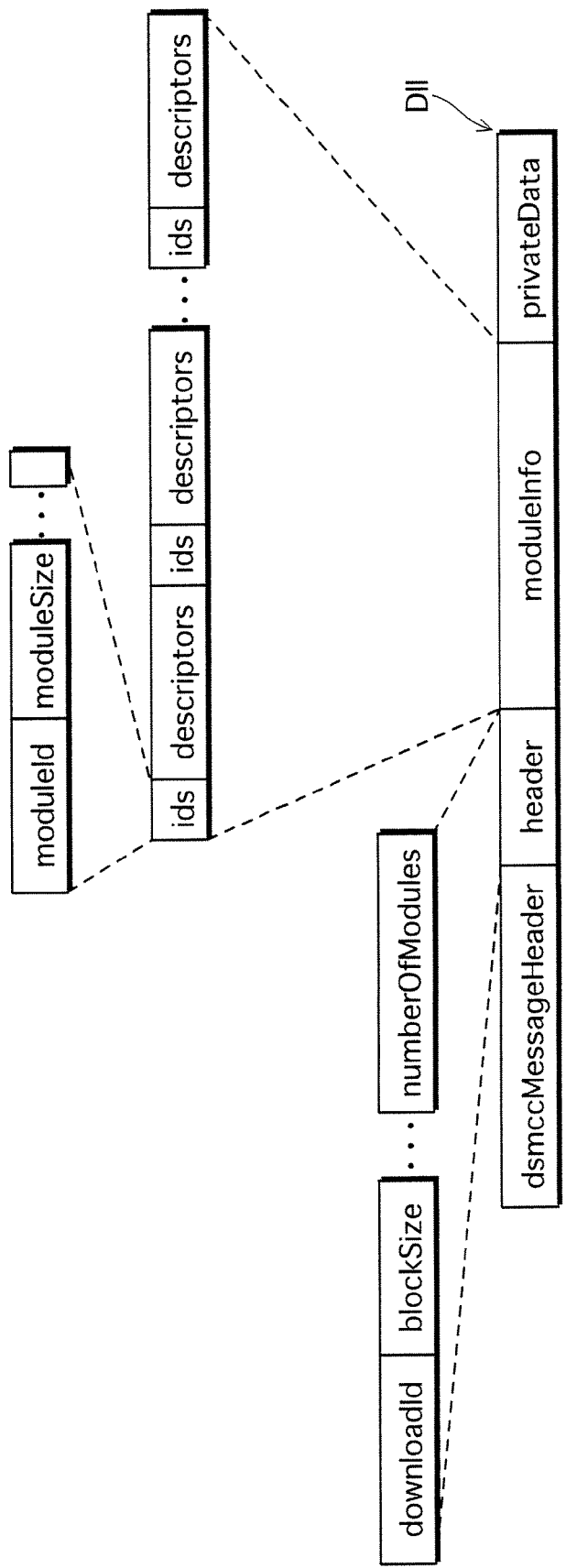
FIG. 4 shows the data structure of the DII.

FIG. 4 shows the data structure of the DII.

As shown in FIG. 4, the "header" of the DII includes "downloaded" indicating the ID for identifying the carousel, "blockSize" indicating the byte length of each block constituting the module, "numberOfModules" indicating the number of modules contained in the carousel, and the like.

The "moduleInfo" includes information on each module, such as "moduleId" indicating an ID of each module, "moduleSize" indicating the byte length of each module, and "Name_descriptor" indicating the file name of the file transmitted as a module.

<DBB>

Here will be described the DDB in detail.

The DDB is a data structure in transmitting data blocks. Each data block has a fixed length and is made by dividing a module. Each DDE has a block number assigned thereto. The content reception/recording device 1000 re-constructs the module by arranging the data blocks in the order of the numbers assigned to the DDBs.

Figure 5:
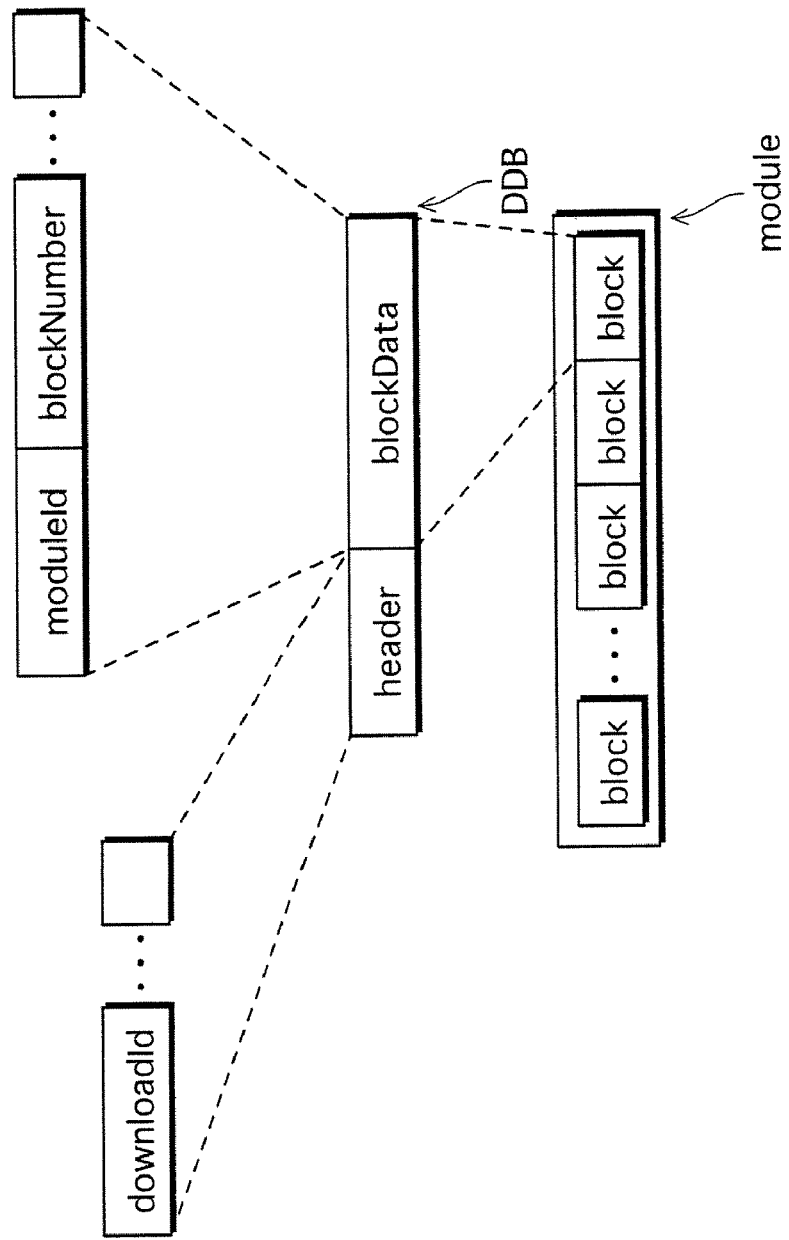
FIG. 5 shows the data structure of the DDB.

FIG. 5 shows the data structure of the DDB.

As shown in FIG. 5, the "header" of the DDE includes "downloadId". The "downloadId" contained in the "header" of the DDB has the same value as the "downloadId" contained in the "header" of the corresponding DII message.

The "blockData" includes "moduleId" indicating the ID of the module to which the data block belongs, "blockNumber" indicating the position of the data block in the module, and the like.

It should be noted here that although, in the present embodiment, the content reception/recording device 1000 accumulates data in units of DDBs, it may accumulate in units of modules.

<Viewing Time Management Table>

FIG. 6 shows a viewing time management table 600 managed by the viewing time managing unit 113.

As shown in FIG. 6, the viewing time management table 600 includes a viewing record 61 and a viewing tendency 62.

The viewing record 61 is a table, in which the vertical axis indicates the days and the horizontal axis indicates the time slots, that includes records of whether the user viewed the broadcast with respect to each time slot indicated in the horizontal axis, for each of the indicated days. The example shown in FIG. 6 the viewing record 61 includes three days (0107, 0108, 0109) of records, where sign "W" indicates the time slot in which the user viewed the broadcast.

The viewing tendency 62 is a table that shows the viewing tendency of the user by the ranks assigned to each time slot indicated in the horizontal axis. In the example shown in FIG. 6, a rank of the viewing tendency for each time slot is determined based on the records of the three days, and is shown in the viewing tendency 62.

For example, the viewing time managing unit 113 assigns: rank "3" to a time slot in which the user viewed for three days; rank "2" to a time slot in which the user viewed on two days among the three days; rank "1" to a time slot in which the user viewed on one day among the three days; and rank "0" to a time slot in which the user did not viewed at all for three days.

It should be noted here that whether or not a viewing was made is determined based on whether the content reception/recording device 1000 is powered on or off. That is to say, if the content reception/recording device 1000 is powered on, it is judged that a viewing is made; and if the content reception/recording device 1000 is powered off, it is judged that a viewing is not made.

The content reception/recording device 1000 is recognized as being powered off when the content reception/recording device 1000 is in a wait state after it receives the power off operation by the user until it receives the power on operation by the user, and this does not indicate that the content reception/recording device 1000 is completely powered off in the actuality by the user's power off operation.

<Operation>

Next, the operation of the content reception/recording device 1000 will be described.

Figure 7:
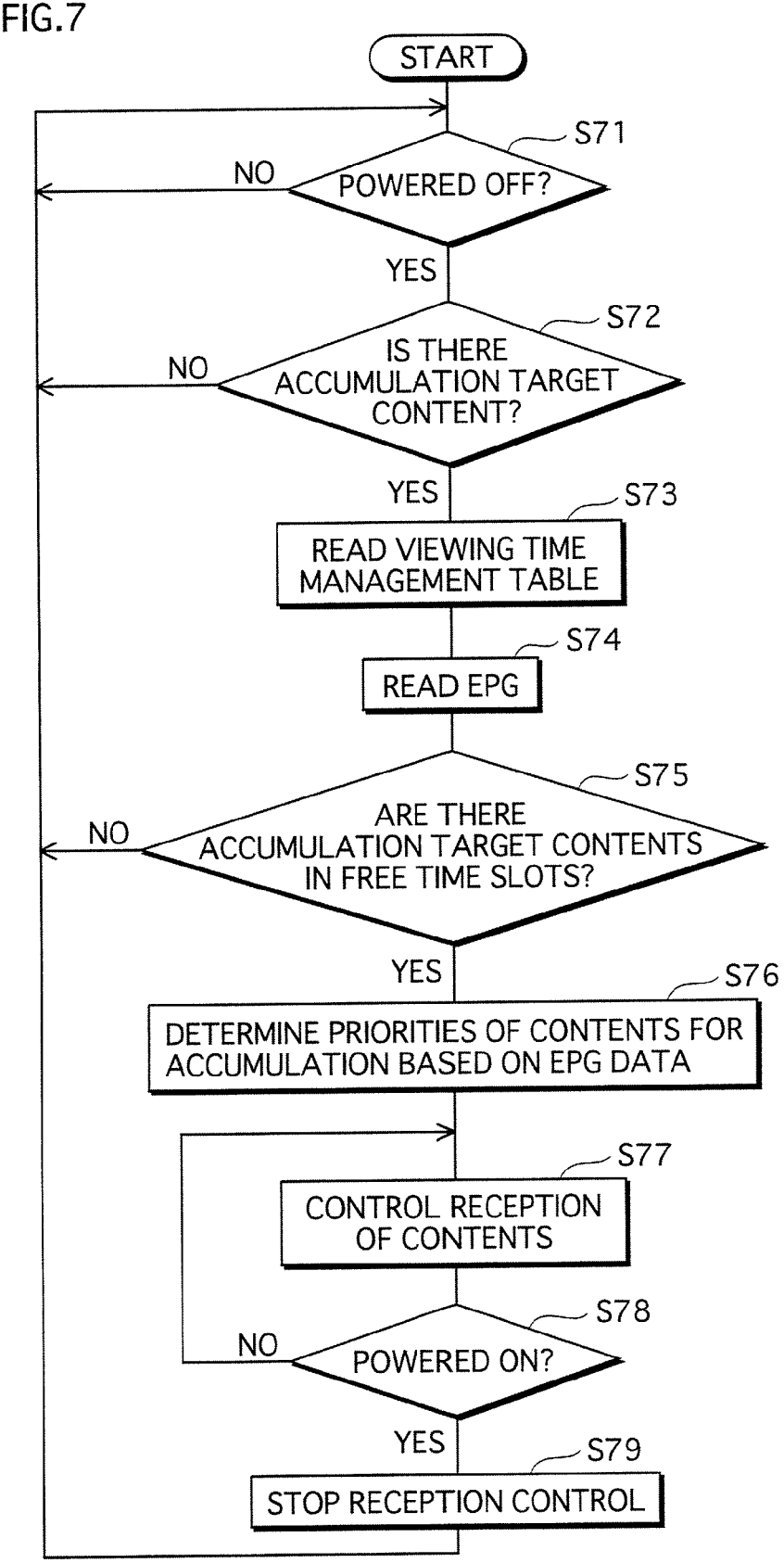
FIG. 7 is a flowchart showing the procedure of the control unit 112 in determining the priorities of the contents for being accumulated when a plurality of contents are transmitted in a same time slot.

FIG. 7 is a flowchart showing the procedure of the control unit 112 in determining the priorities of the contents for being accumulated when a plurality of contents are transmitted in a same time slot.

The control unit 112 waits when the device is powered ON (NO in step S71) or there is no accumulation target content (NO in step S72). When the operation receiving unit 115 receives the power off operation by the user (YES in step S71), the control unit 112 checks on the accumulation state of contents in the accumulation medium 114, and judges whether or not there is an accumulation target content (step S72).

If it judges that there is an accumulation target content (YES in step S72), the control unit 112 reads the viewing time management table 600 managed by the viewing time managing unit 113 (step S73). The control unit 112 then reads the EPG data from the memory 111 (step S74).

After reading the viewing time management table 600 and the EPG data, the control unit 112 refers to the viewing tendency 62 in the viewing time management table 600 and extracts time slots to which rank "0" has been assigned, namely extracts time slots in which the user viewed the broadcast at the lowest frequency. The control unit 112 then judges whether or not there are accumulation target contents in the extracted time slots, by referring to the EPG data (step S75).

If the result of the judgment in step S75 is negative, the control returns to step S71; and if the result of the judgment in step S75 is positive, the control unit 112 determines the priorities of the contents for accumulation, based on the transmission timing of each accumulation target content shown in the EPG data (step S76). More specifically, the control unit 112 refers to the EPG data and determines the priorities in accumulating the plurality of accumulation target contents that are transmitted simultaneously in the same time slot, such that a content having a less number of remaining transmissions is assigned with a higher priority.

After it determines the priorities of the contents for accumulation, the control unit 112 controls the reception of the contents in accordance with the determined priorities (step S77). The content reception control process is continued until the operation receiving unit 115 receives the power on operation by the user (YES in step S78).

After the operation receiving unit 115 receives the power on operation by the user (YES in step S78), the control unit 112 stops the content reception control process (step S79), and returns to step S71.

<Supplementary Notes>

The above-described embodiment is one example of embodiment of the present invention. The present invention is not limited to the embodiment, but includes, for example, the following modifications.

(1) In the above-described embodiment, it is explained in relation to step S76 in FIG. 7 that the priorities in accumulating the plurality of accumulation target contents, which are transmitted simultaneously in the same time slot, are determined such that a content having a less number of remaining transmissions is assigned with a higher priority. However, the method for determining the priorities is not limited to this.

For example, the control unit 112 may detect the amount of not-accumulated data for each accumulation target content, based on the content transmission time shown in the EPG data and the accumulation state of each content in the accumulation medium 114. The control unit 112 then determines the priorities such that a content having a larger or smaller amount of not-accumulated data is assigned with a higher priority, based on the detection results.

Alternatively, the control unit 112 may determine the priorities such that a content having an earlier accumulation completion time in time slots, among the time slots extracted in step S75, in which the user viewed the broadcast at the lowest frequency, is assigned with a higher priority for the accumulation.

Also, the control unit 112 may perform the accumulation by a preselection if there is a time after an accumulation of a module is completed before the next module to be accumulated starts to be transmitted, in time slots, among the time slots extracted in step S75, in which the user viewed the broadcast at the lowest frequency.

Also, the control unit 112 may determine the priorities such that a content requiring a shorter time to accumulate, or a content requiring a longer time to accumulate is assigned with a higher priority.

Also, the control unit 112 may determine the priorities of the contents for accumulation such that a content specified by the user is assigned with the highest priority.

Also, the transmitted EPG data may include parameters that indicate importance levels of the respective contents, and the control unit 112 may determine the priorities such that a content indicated by the corresponding parameter to have a higher importance level is assigned with a higher priority.

Also, the control unit 112 may determine the priorities of the contents for accumulation such that a content transmitted over a channel having a higher viewing tendency of the user is assigned with a higher priority.

Also, the control unit 112 may determine the priorities of the channels for accumulation such that a channel that transmits a content having a higher viewing tendency of the user is assigned with a higher priority.

Also, the control unit 112 may determine the priorities of the channels or contents for accumulation such that a channel or a content that has been held by the content reception/recording device 1000 is assigned with the highest priority.

The above-mentioned determination methods may be combined.

(2) In the above-described embodiment, contents to be accumulated are specialized in the contents transmitted in the digital broadcasting. However, not limited to this, contents transmitted using a communication line or another transmission means may be accumulated.

(3) In the above-described embodiment, the start of the content reception control process by the control unit 112 is triggered by a power off (step S71). However, not limited to this, the start of the content reception control process may be triggered by a switching between channels or by a timing selected by the user.

(4) In the above-described embodiment, the EPG data for use is obtained by receiving the data broadcast. However, not limited to the data broadcast, the EPG data for use may be obtained via a communication network, such as the Internet, connected to the device.

(5) In the above-described embodiment, the viewing tendency stored in the viewing time management table 600 is determined based on the records of three days. Not limited to three days, the viewing tendency may be determined based on the records of a period longer than three days. Also, in the above-described embodiment, the viewing tendency is represented by four ranks. However, not limited to this, the viewing tendency may be represented by more than four ranks.

Also, in the above-described embodiment, the viewing tendency is managed in units of hours. However, not limited to this, the viewing tendency may be managed in a unit that is longer than the hour or in a unit that is shorter than the hour such as the minute or second.

Also, in the above-described embodiment, it is judged whether or not the viewing was made, based on whether the device was powered on or off. However, not limited to this, whether or not a viewing was made in a time slot may be judged based on whether or not a hardware resource related to the content reception accumulation process was operated in the time slot.

In step S75 shown in FIG. 7, the control unit 112 refers to the viewing tendency 62 in the viewing time management table 600 and extracts time slots to which rank "0" has been assigned. However, not limited to this, time slots in which the viewing frequency of the user was lower than a predetermined value may be extracted.

(6) In the above-described embodiment, the content reception/recording device obtains the content data by a digital broadcasting that may be BS, CS, terrestrial or the like. However, not limited to this, contents may be obtained by the CATV or via a communication path such as a communication via a network.

(7) In the above-described embodiment, the number of contents that can be received in the same time slot is determined by the number of tuners. However, not limited to this, the number of receivable contents may be determined based on the speed at which the data is accumulated, namely, for example, based on the speed at which the data is written to the HDD.

In the above-described embodiment, the content reception/recording device may be implemented as part of a portable electronic device such as a portable phone, a home AV device such as an optical disc player, a peripheral device such as a remote controller of the home AV device, a home game machine, a personal computer, a peripheral device such as a printer of the personal computer, or a home electric appliance.

In the above-described embodiment, the constituent elements of the content reception/recording device are arranged inside the content reception/recording device. However, not limited to this, part of the constituent elements may be arranged outside the content reception/recording device, or may be connected to the content reception/recording device via a network.

In the above-described embodiment, accesses among the constituent elements of the content reception/recording device may be performed via the OS (Operating System).

Further, the content maybe: video information such as MPEG2 or MPEG4; audio information such as AAC (Advanced Audio Coding); data written in a structural description language such as BML (Broadcast Markup Language) or HTML (HyperText Markup Language); video information such as JPEG (Joint Photographic Expert Group) or PNG (Portable Network Graphics); a script such as EcmaScript; metadata; or a program written in Java.

Each of the above-described functional blocks of the reception/recording device may be achieved as an LSI being an integrated circuit. Each of the functional blocks maybe achieved separately in one chip, or part or all of the functional blocks may be achieved in one chip. It should be noted here that although the term LSI is used here to indicate an integrated circuit for controlling the program retrieval device, the integrated circuit may be called IC, system LSI, super LSI, ultra LSI or the like, depending on the level of integration. Also, the integrated circuit is not limited to the LSI, but may be achieved by a dedicated circuit or a general purpose processor. It is also possible to achieve the integrated circuit by using the FPGA (Field Programmable Gate Array) that can be re-programmed after the LSI is manufactured, or a reconfigurable processor that can reconfigure the connection and settings of the circuit cells inside the LSI. Furthermore, a technology for an integrated circuit that replaces the LSI may appear in the near future as the semiconductor technology improves or branches into another technologies. In that case, the new technology may be incorporated into the integration of the functional blocks constituting the present invention as described above. Such possible technologies include biotechnology.

The present invention may be methods shown by the above. The present invention may be a computer program that allows a computer to realize the methods, or may be digital signals representing the computer program.

Furthermore, the present invention may be a computer-readable recording medium, such as an optical disc like CD-ROM, MO, DVD, DVD-ROM, DVD RAM, BD (Blu-ray Disc), a flexible disk, a hard disk, or a semiconductor memory, that stores the computer program or the digital signal. Furthermore, the present invention may be the computer program or the digital signal recorded on any of the aforementioned recording mediums.

Furthermore, the present invention may be the computer program or the digital signal transmitted on an electric communication line, a wireless or wired communication line, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal via the recording medium, or by transferring the program or the digital signal via the network or the like, the program or the digital signal may be executed by another independent computer system.

(9) The present invention may be any combination of the above-described embodiment and modifications.

INDUSTRIAL APPLICABILITY

The present invention can be used in a reception device that receives a digital broadcast.

The invention claimed is:

1. A content reception/recording device for selectively receiving and accumulating transmitted contents, comprising:
a receiving unit;
an accumulation medium;
a storage unit storing therein free time slot information that indicates a free time slot in which a predetermined resource provided in the content reception/recording device is determined, according to statistics in a past, not to operate;
an obtaining unit to obtain one or more pieces of transmission timing information that indicate timings at which accumulation target contents are transmitted respectively;
a judging unit to judge whether or not the timings indicated by the obtained transmission timing information are present in the free time slot indicated by the free time slot information; and
a control unit to, if the judging unit judges that the timings are present in the free time slot, to control the receiving unit to receive the accumulation target contents that are transmitted at the timings and to accumulate the received contents in the accumulation medium.

2. The content reception/recording device of claim 1 further comprising:

a determining unit operable to, if a plurality of timings indicated by the obtained transmission timing information are present in the free time slot indicated by the free time slot information, determine priorities of a plurality of accumulation target contents, which are to be transmitted at the plurality of timings indicated by the obtained transmission timing information, for being accumulated in the free time slot, in accordance of timings,
wherein the control unit controls the receiving unit to receive the accumulation target contents in accordance with the determined priorities and to accumulate the received contents in the accumulation medium.

3. The content reception/recording device of claim 2, wherein
the determining unit detects a number of remaining transmissions of each of the plurality of accumulation target contents by referring to the transmission timing information, and determines the priorities such that a content having a less number of remaining transmissions is assigned with a higher priority for the accumulation.

4. The content reception/recording device of claim 2, wherein
the determining unit detects an amount of not-accumulated data of each of the plurality of accumulation target contents from (i) accumulation states of the accumulation target contents in the accumulation medium and (ii) the transmission timings of the accumulation target contents indicated by the transmission timing information, and determines the priorities such that a content having a larger or smaller amount of not-accumulated data is assigned with a higher priority for the accumulation.

5. The content reception/recording device of claim 2, wherein
the determining unit determines the priorities of the contents for being accumulated in the free time slot such that a content whose not-accumulated data requires a longer time to accumulate is assigned with a higher priority for the accumulation.

6. The content reception/recording device of claim 2, wherein
the determining unit detects an accumulation completion time for each of the plurality of accumulation target contents, in accordance with (i) accumulation states of the accumulation target contents in the accumulation medium and (ii) transmission timings of the accumulation target contents indicated by the transmission timing information, and determines the priorities such that a content having an earlier accumulation completion time is assigned with a higher priority for the accumulation.

7. The content reception/recording device of claim 2, wherein
the determining unit selects an accumulation target content whose accumulation is completed within the free time slot, out of the plurality of accumulation target contents, in accordance with (i) accumulation states of the accumulation target contents in the accumulation medium and (ii) transmission timings of the accumulation target contents indicated by the transmission timing information, and determines the priorities such that the selected content is assigned with a higher priority for the accumulation.

8. The content reception/recording device of claim 2 further comprising:
an operation time slot recording unit operable to record, as an operation time slot, a time slot in which the predetermined operation instructed by the user is performed; and a free time slot detecting unit operable to detect a free time slot in which the predetermined operation instructed by the user is performed at a predetermined frequency or lower, wherein the free time slot information stored in the storage unit indicates the detected free time slot.

9. The content reception/recording device of claim 8, wherein
the operation time slot recorded by the operation time slot recording unit is a time slot in which a hardware resource for receiving or accumulating the transmitted content operates according to an instruction by the user.

10. The content reception/recording device of claim 2, wherein
the transmission timing information further includes type information that indicates types of transmitted contents,
the content reception/recording device further comprises
a viewing tendency recording unit recording therein a viewing tendency of the user for each of the types of transmitted contents indicated by the type information, and
the determining unit determines the priorities in accordance with the type information and transmission timings of the transmitted contents indicated by the transmission timing information, such that a content having a higher viewing tendency of the user is assigned with a higher priority for the accumulation.

11. The content reception/recording device of claim 2, wherein
the receiving unit receives contents that are transmitted by a digital broadcasting,
the transmission timing information further includes channel information that indicates channels over which the contents are transmitted,
the content reception/recording device further comprises
a channel viewing tendency recording unit recording therein a channel viewing tendency of the user, and
the determining unit determines the priorities in accordance with the channel information and the transmission timing of each accumulation target content indicated by the transmission timing information, such that a content having a higher channel viewing tendency of the user is assigned with a higher priority for the accumulation.

12. The content reception/recording device of claim 2, wherein
the transmission timing information further includes importance level parameters that indicate importance levels of the transmitted contents, and
the determining unit determines the priorities in accordance with the importance level parameters and the transmission timing of each accumulation target content indicated by the transmission timing information, such that a content having a predetermined importance level parameter is assigned with a higher priority for the accumulation.

13. The content reception/recording device of claim 2, wherein
the determining unit further includes a reception subunit operable to receive, from the user, priorities of the plurality of accumulation target contents for the accumulation, and
if the reception subunit has received the priorities from the user, the control unit controls the receiving unit in accordance with the priorities received by the reception subunit.

14. The content reception/recording device of claim 2 preliminarily storing therein priorities of the plurality of accumulation target contents for being received, and the control unit controls the receiving unit in accordance with the preliminarily stored priorities.

15. A content reception/recording method for use in a content reception/recording device which is provided with an accumulation medium and selectively receives and accumulates transmitted contents in the accumulation medium, the content reception/recording method comprising the steps of:
receiving;
storing free time slot information that indicates a free time slot in which a predetermined resource provided in the content reception/recording device is determined, according to statistics in a past, not to operate;
obtaining one or more pieces of transmission timing information that indicate timings at which accumulation target contents are transmitted respectively;
judging whether or not the timings indicated by the obtained transmission timing information are present in the free time slot indicated by the free time slot information; and
controlling to, if the judging step judges that the timings are present in the free time slot, receive the accumulation target contents that are transmitted at the timings and to accumulate the received contents in the accumulation medium.

16. A non-transitory computer-readable recording medium recording therein a control program for causing a content reception/recording device, which is provided with an accumulation medium, to perform a process of selectively receiving and accumulating transmitted contents in the accumulation medium, the control program recorded in the recording medium comprising the steps of:
receiving;
storing free time slot information that indicates a free time slot in which a predetermined resource provided in the content reception/recording device is determined, according to statistics in a past, not to operate;
obtaining one or more pieces of transmission timing information that indicate timings at which accumulation target contents are transmitted respectively;
judging whether or not the timings indicated by the obtained transmission timing information are present in the free time slot indicated by the free time slot information; and
controlling to, if the judging step judges that the timings are present in the free time slot, receive the accumulation target contents that are transmitted at the timings and to accumulate the received contents in the accumulation medium.

17. An information processing device comprising:
a storage unit storing therein free time slot information that indicates a free time slot in which a predetermined resource provided in the content reception/recording device is determined, according to statistics in a past, not to operate;
an obtaining unit operable to obtain one or more pieces of transmission timing information that indicate timings at which accumulation target contents are transmitted respectively;
a judging unit operable to judge whether or not the timings indicated by the obtained transmission timing information are present in the free time slot indicated by the free time slot information; and
a control unit operable to, if the judging unit judges that the times are present in the free time slot, control reception of the accumulation target contents that are transmitted at the timings and to accumulate the received contents.

18. The content reception/recording device of claim 2, wherein when a plurality of complementation target contents, which require complementation, are transmitted in the free time slot, the determining unit determines priorities of the complementation target contents for being complemented with respect to accumulation in the free time slot, in accordance with the transmission timing information obtained by the obtaining unit; and the control unit controls the receiving unit to receive the complementation target contents in accordance with the determined priorities for complementation and to accumulate the received complementation target contents in the accumulation medium.

\* \* \* \* \*

UNITED STATES PATENT AND TRADEMARK OFFICE
CERTIFICATE OF CORRECTION

PATENT NO.        : 8,078,038 B2
APPLICATION NO.   : 11/574215
DATED             : December 13, 2011
INVENTOR(S)       : Rikiya Masuda et al.

It is certified that error appears in the above-identified patent and that said Letters Patent is hereby corrected as shown below:

Claim 1, Column 17, lines 61-62, the word "to" is repeated twice, "a control unit to, if the judging unit judges that the timings are present in the free time slot, to control the receiving..." and the second "to" should be deleted.

Signed and Sealed this
Twentieth Day of March, 2012

David J. Kappos
*Director of the United States Patent and Trademark Office*